J. W. SHELBURNE.
DRIVING GEARING FOR TRACTION ENGINES.
APPLICATION FILED MAR. 28, 1910.
987,020.
Patented Mar. 14, 1911.
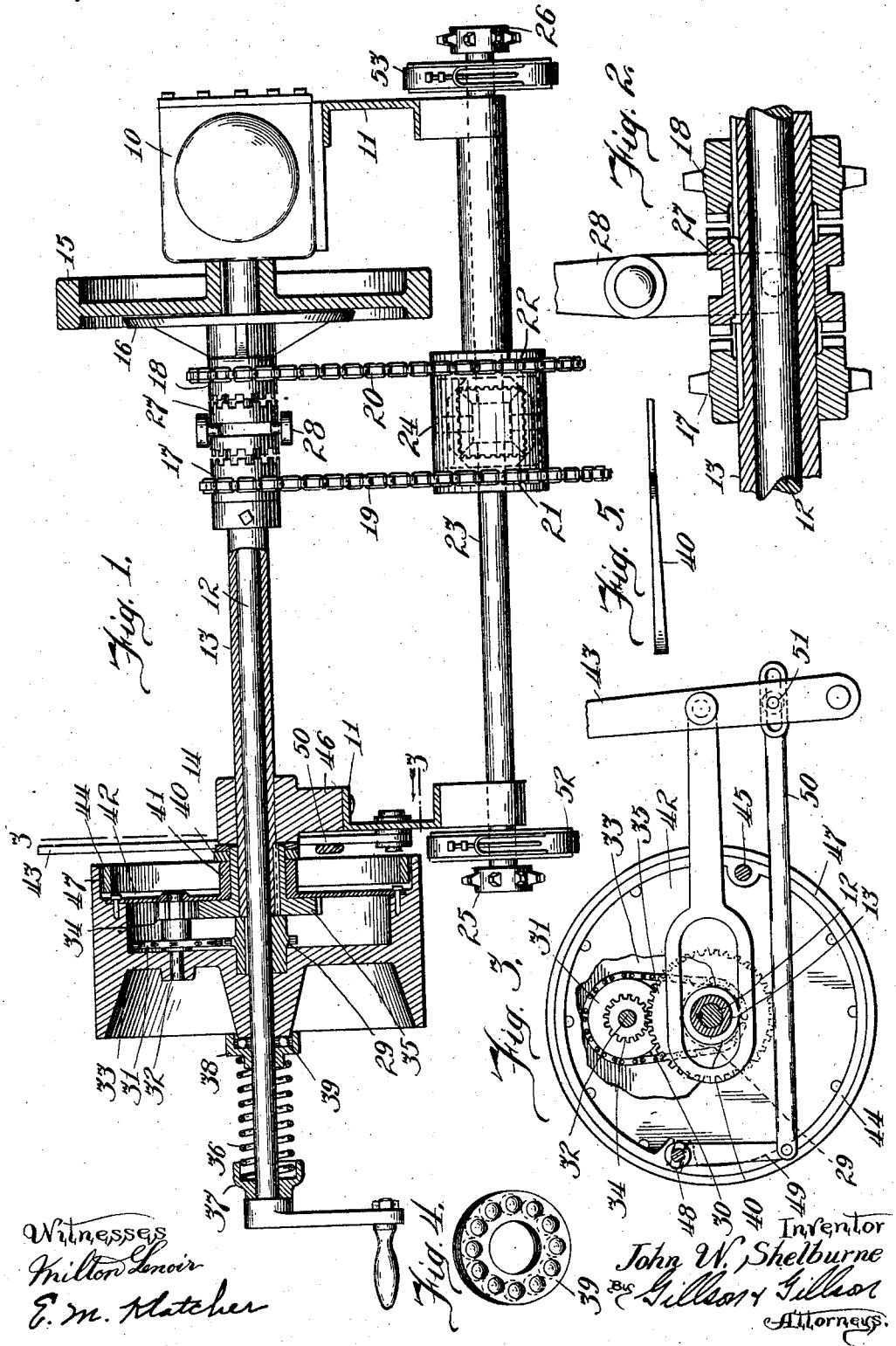

UNITED STATES PATENT OFFICE.

JOHN WILLIAM SHELBURNE, OF NEW LONDON, MISSOURI.

DRIVING-GEARING FOR TRACTION-ENGINES.

987,020.  Specification of Letters Patent.  Patented Mar. 14, 1911.

Application filed March 28, 1910. Serial No. 552,058.

*To all whom it may concern:*

Be it known that I, JOHN W. SHELBURNE, a citizen of the United States, and resident of New London, county of Ralls, and State of Missouri, have invented certain new and useful Improvements in Driving - Gearing for Traction-Engines, of which the following is a specification, and which are illustrated in the accompanying drawings, forming a part thereof.

The invention relates to driving mechanism for traction engines especially adapted for use in connection with internal combustion motors; its object being to provide a simple and effective gearing for transmitting power at variable speeds and in either direction.

The invention consists in a structure such as is hereinafter described, and as illustrated in the accompanying drawings, in which—

Figure 1 is a detail plan view, partly in section, of the device; Fig. 2 is a detail longitudinal section of the engine shaft and clutch mechanism; Fig. 3 is a detail section, partly in elevation, on the line 3—3 of Fig. 1; Fig. 4 is a detail of a thrust bearing used in connection with the gearing; and Fig. 5 is a detail of the clutch-controlling cam.

The device comprises in part a planetary type of gearing and in part the so-called selective type of transmission mechanism, as will be hereinafter fully pointed out. The gearing is especially adapted for use in connection with traction vehicles, but inasmuch as the invention relates only to the gearing for transmitting power from the engine the vehicle is now shown.

There is illustrated in the drawings a single-cylinder gas engine 10, mounted upon a supporting frame shown in part at 11. The engine shaft 12 rotates within a sleeve 13, which is journaled in a bearing 14 carried by the frame of the machine. The fly-wheel of the motor is represented at 15, and is keyed upon the shaft 12. A disk clutch 16, fixed upon the sleeve 13, is adapted to engage the disk face of the wheel 15 to lock the sleeve and shaft together.

A pair of sprocket wheels 17, 18, are mounted loosely upon the sleeve 13, and carry, respectively, chains 19, 20, which run upon sprocket wheels 21, 22, mounted upon a two-part countershaft 23, provided with a differential gearing, conventionally shown at 24, and carrying sprocket wheels 25, 26, from which chains (not shown) may lead to the traction wheels of the vehicle. A clutch member 27, splined upon the sleeve 13 and controlled by a shipper lever 28, is located between the gears 17 and 18 and adapted to lock them in alternation with the sleeve 13. These latter gears are differentiated in size for the purpose of driving the countershaft 23 at different speeds. For driving the vehicle forward it is necessary only to engage the clutch 16 with the fly-wheel 15 and the clutch 27 with either one of the wheels 17, 18.

A sprocket wheel 29 is splined upon the shaft 12 beyond the end of the sleeve 13, and drives, through the medium of a chain 30, a sprocket wheel 31, journaled upon a shaft 32, carried by a wheel shown in the form of a casing 33 rotatably mounted upon the shaft 12 and the hub of the wheel 29. A pinion 34, in fixed relation with the sprocket wheel 31, meshes with a gear 35 keyed upon the sleeve 13. A spring 36, coiled about the shaft 12, reacts between a collar 37 fixed upon the shaft and a collar 38 loosely mounted thereon, and having a thrust bearing upon the hub of the casing 33—anti-friction ball bearings 39 being preferably interposed. The spring 36 normally holds the clutch 16 in engagement with the fly-wheel 15. A wedge 40, taking the form of a yoke, is interposed between the bearing 14 and the hub 41 of the cover 42 of the gear case 33, and is controlled by means of a lever 43. By advancing the wedge the sleeve 13 is moved in opposition to the spring 36 to disengage the clutch 16.

An internal expanding brake-band 44, anchored at 45 to a part 46 of the frame of the machine, engages the inner face of the flanged periphery 47 of the gear case 33, but is normally contracted and out of engagement therewith. A cam-block 48, interposed between the ends of the brake-band 44 and actuated by a lever-arm 49, expands the brake and engages it with the gear case. The lever 49 is controlled by the lever 43 through the medium of a link 50, the pin 51 connecting these two members passing through a longitudinal slot in the link to allow lost motion, thereby providing for a sufficient movement of the cam wedge 40 to disengage the clutch 16 before expanding the brake-band 44.

When the vehicle is driven forward, as already explained, the shaft 12, sleeve 13, and the gear case 33 rotate together. When it is desired to reverse the direction of movement of the vehicle, the cam wedge 40 is advanced to disengage the clutch 16 and expand the brake-band 44, thus stopping the gear case 33. The sprocket wheel 31 is thus caused to rotate in the same direction as the shaft 12, and, through the gears 34 and 35, drives the sleeve 13 in the opposite direction. The clutch 27 being now engaged with either of the gears 17, 18, will drive the vehicle backwardly.

The device is especially adapted for use in connection with farm implements, and may be applied to a vehicle ordinarily known as a traction engine, or to a plow or other farming tool. The two sections of the countershaft 23 are provided with independent brakes, conventionally shown at 52, 53, which may be employed in steering the vehicle or stopping it. When it is desired to use the motor for driving machinery not mounted upon the vehicle, a belt may be placed upon the periphery of the gear case 33, and this case may be rotated with the engine shaft by permitting the engagement of the clutch 16 with the wheel 15, the brake-band 44 being disengaged from the flange 46, the gear-case being thus locked to both the shaft and the sleeve as the sprocket wheel 27 and the gear 35 tend to drive the sprocket-wheel 31 and pinion 34 in opposite directions.

I claim as my invention:

1. In power transmitting gearing, in combination, a power shaft, a shaft sleeved thereon, a clutch for locking the two shafts together, a casing loosely mounted on the power shaft, an axially disposed shaft carried by the casing, a sprocket wheel and a pinion mounted loosely on the last named shaft and fixedly united, a sprocket wheel mounted upon the power shaft and rotatable therewith, a chain uniting the two sprocket wheels, and a gear wheel fixed upon the sleeved shaft and meshing with the first named gear.

2. In power transmitting gearing, in combination, a power shaft, a shaft sleeved thereon, a casing loosely mounted on the power shaft, an axially disposed shaft carried by the casing, a sprocket wheel and a pinion mounted loosely on the last named shaft and fixedly united, a sprocket wheel mounted upon the power shaft and rotatable therewith, a chain uniting the two sprocket wheels, a gear wheel fixed upon the sleeved shaft and meshing with the first named gear and means for locking the casing against rotation.

3. In power transmitting gearing, in combination, a power shaft, a shaft sleeved thereon, a casing loosely mounted on the power shaft, an axially disposed shaft carried by the casing, a sprocket wheel and a pinion mounted loosely on the last-named shaft and fixedly united, a sprocket wheel mounted upon the power shaft and rotatable therewith, a chain uniting the two sprocket wheels, a gear wheel fixed upon the sleeved shaft and meshing with the first-named gear, and means for locking the power shaft and the sleeved shaft together.

4. In power transmitting gearing, in combination, a power shaft, a shaft sleeved thereon, a casing loosely mounted on the power shaft, an axially disposed shaft carried by the casing, a pair of gears mounted loosely on the last-named shaft and fixedly united, a gear mounted on the power shaft and rotating therewith, gear connection between the last-named gear and the pair of united gears for driving them in the same direction, a gear-wheel fixed upon the sleeved shaft and meshing with one of the pair of united gears, and means for locking the casing against rotation.

5. In power transmitting gearing, in combination, a power shaft, a shaft sleeved thereon, a casing loosely mounted on the power shaft, an axially disposed shaft carried by the casing, a pair of gears mounted loosely on the last named shaft and fixedly united, a gear mounted on the power shaft and rotating therewith, gear connection between the last-named gear and the pair of united gears for driving them in the same direction, a gear-wheel fixed upon the sleeved shaft and meshing with one of the pair of united gears, and means for locking the power shaft and sleeved shaft together.

6. In power transmitting gearing in combination, a power shaft, a shaft sleeved thereon, a casing loosely mounted on the power shaft, an axially disposed shaft carried by the casing, a sprocket wheel and a pinion mounted loosely on the last named shaft and fixedly united, a sprocket wheel mounted upon the power shaft and rotatable therewith, a chain uniting the two sprocket wheels, a gear wheel fixed upon the sleeved shaft and meshing with the first named gear, and means for locking the casing against rotation.

7. In power transmitting gearing, in combination, a power shaft, a shaft sleeved thereon, a clutch for locking the two shafts together, a casing loosely mounted on the power shaft, an axially disposed shaft carried by the casing, a sprocket wheel and a pinion mounted loosely on the last named shaft and fixedly united, a sprocket wheel mounted upon the power shaft and rotatable therewith, a chain uniting the two sprocket wheels, a gear wheel fixed upon the sleeved shaft and meshing with the first named gear, a brake for locking the casing against rotation, and means for disengaging the clutch and setting the brake.

8. In power transmitting gearing, in combination, a power shaft, a shaft sleeved thereon, a clutch for locking the two shafts together, a casing loosely mounted on the power shaft, an axially disposed shaft carried by the casing, a sprocket wheel and a pinion mounted loosely on the last named shaft and fixedly united, a sprocket wheel mounted upon the power shaft and rotatable therewith, a chain uniting the two sprocket wheels, a gear wheel fixed upon the sleeved shaft and meshing with the first named gear, a wedge for disengaging the clutch, a brake for locking the casing against rotation, and a lever for actuating the wedge and brake.

9. In power transmitting gearing, in combination, a power shaft, a shaft sleeved thereon, a clutch for locking the two shafts together, a casing loosely mounted on the power shaft, an axially disposed shaft carried by the casing, a sprocket wheel and a pinion mounted loosely on the last named shaft and fixedly united, a sprocket wheel mounted upon the power shaft and rotatable therewith, a chain uniting the two sprocket wheels, a gear wheel fixed upon the sleeved shaft and meshing with the first named gear, a wedge for disengaging the clutch, a brake for locking the casing against rotation, and a lever for actuating the wedge and brake successively.

JOHN WILLIAM SHELBURNE.

Witnesses:
 GEO. F. WATSON,
 MAY WATSON.

---

Copies of this patent may be obtained for five cents each, by addressing the "Commissioner of Patents, Washington, D. C."